M. ECK.
OPERATING MECHANISM FOR SALAD DRESSING MIXING AND SERVING RECEPTACLES.
APPLICATION FILED SEPT. 5, 1917.
1,321,609.
Patented Nov. 11, 1919.
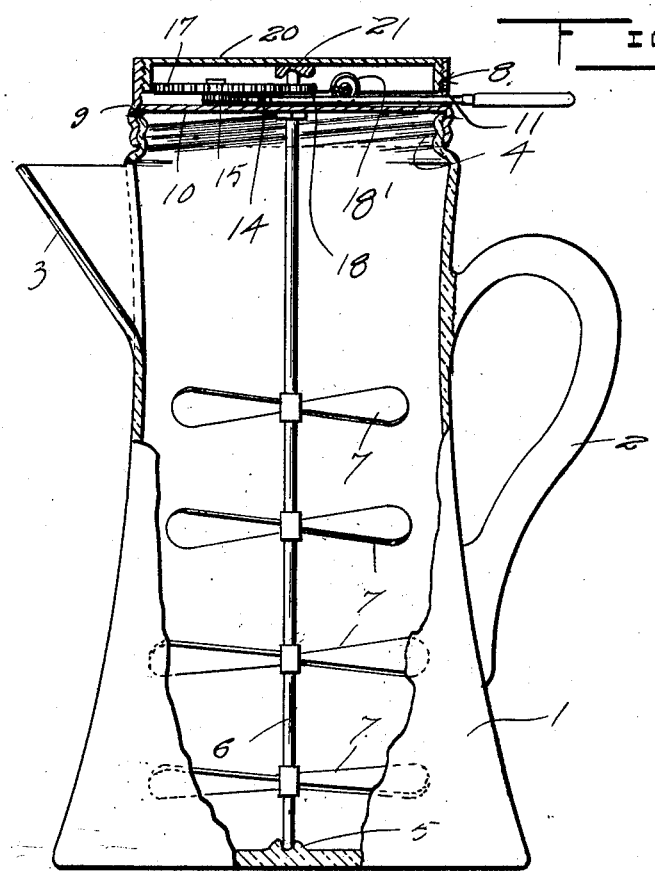
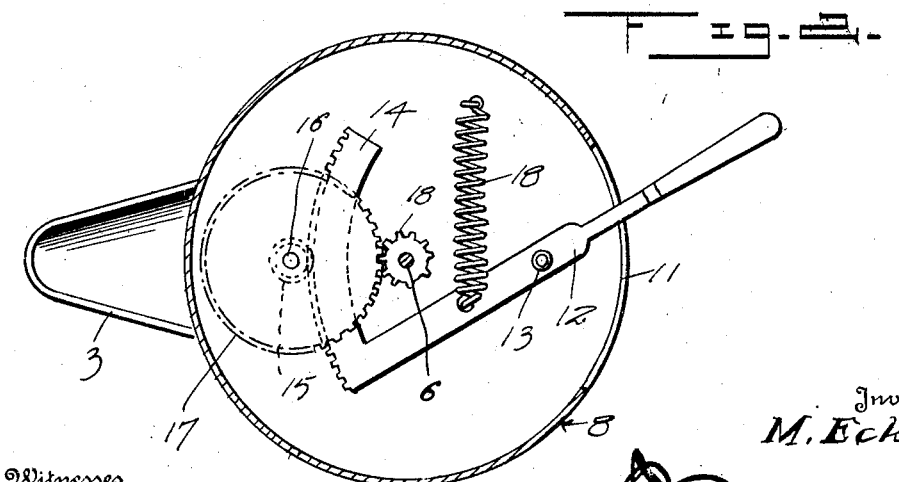
Witnesses
C. A. Bealle
W. F. Davidson
Inventor
M. Eck.
By
Attorney

UNITED STATES PATENT OFFICE.

MAX ECK, OF PHILADELPHIA, PENNSYLVANIA.

OPERATING MECHANISM FOR SALAD-DRESSING MIXING AND SERVING RECEPTACLES.

1,321,609.　　　　　　Specification of Letters Patent.　　Patented Nov. 11, 1919.

Application filed September 5, 1917. Serial No. 189,756.

*To all whom it may concern:*

Be it known that I, MAX ECK, a citizen of the United States, residing at Philadelphia, in the county of Philadelphia and State of Pennsylvania, have invented certain new and useful Improvements in Operating Mechanism for Salad-Dressing Mixing and Serving Receptacles; and I do hereby declare the following to be a full, clear, and exact description of the invention, such as will enable others skilled in the art to which it appertains to make and use the same.

This invention relates to improvements in a salad dressing mixing and serving receptacle and has for one of its objects the provision of a device of this character, whereby the ingredients may be thoroughly mixed into salad dressing or the like and served to the consumer.

Another object of this invention is the provision of a receptacle having an agitator therein, whereby the ingredients may be placed within the receptacle and thoroughly mixed by the agitator into a salad dressing or the like and served to the consumer within the receptacle and any salad dressing or the like that is not used by the consumer may be kept within the receptacle until used, thus obviating the waste of salad dressing or the like when served to customers in a dish or like receptacle which has to be dispensed with after the customer uses what is desired.

A further object of this invention is the provision of a cover with the receptacle having an operating means mounted therein and operatively connected with the agitator, whereby, upon operating the operating means, the agitator will be rotated.

A still further object of this invention is the provision of a salad dressing mixing and serving receptacle of the above stated character, which will be simple, durable and efficient, and which may be manufactured and sold at a comparatively low cost.

With these and other objects in view, it will become more apparent as the description proceeds that the invention consists in certain novel features of construction, combination and arrangement of parts as will be hereinafter more fully described and claimed.

For a complete understanding of my invention, reference is to be had to the following description and accompanying drawing, in which:

Figure 1 is a vertical sectional view of a salad dressing mixing and serving receptacle constructed in accordance with my invention, Fig. 2 is a longitudinal sectional view of the same.

Referring in detail to the drawing, the numeral 1 indicates a receptacle constructed of glass and preferably in the shape of a cup as illustrated in Fig. 1. The receptacle is provided with the usual handle 2 and a pouring spout 3 and is provided with its upper end crimped to form threads 4. The bottom wall of the receptacle 1 is provided with a bearing 5 to receive the lower end of a shaft 6. The shaft 6 has a plurality of blades 7 secured thereto for coöperating with the shaft in forming an agitator.

A cover 8 consisting of a body portion 9 is threaded to the threads 4 of the receptacle 1 and to provide with it a closing wall 10 which is apertured to receive the upper end of the shaft 6. The body portion 9 is provided with an elongated slot 11 to receive an operating lever 12 which is pivoted to the wall 10 as illustrated at 13. The operating lever 12 has formed thereon rack bar 14 which meshes with a pinion 15 upon a stub shaft 16. A large gear 17 is secured to the stub shaft 16 and meshes with a pinion 18 secured to the upper end of the shaft 6, whereby, upon rocking the operating lever 12 upon its pivot 13, the agitator will be rotated in either direction. A coiled spring 18 is secured to the operating lever and to the wall 10 for the purpose of retaining the operating lever in its normal position at all times, whereby upon moving the operating lever 12 in one direction to rotate the agitator, the operating lever will be returned to its normal position by the influence of the spring 18 rotating the agitator in the opposite direction.

A cap 20 is threaded to the body 9 and coöperates with the wall 10 in forming a chamber or inclosure for the various gears and pinions mounted upon the wall 10. A bearing 21 is formed upon the cap 20 and receives the upper end of the shaft 6 and coöperates with the bearing 5 in supporting the shaft 6 vertically of the receptacle 1.

From the foregoing description taken in connection with the accompanying drawing, it will be noted that a novel form of receptacle has been provided wherein ingredients may be placed and thoroughly mixed to form salad dressing or the like and which dressing may be served to customers in the receptacle keeping it in a sanitary condition for a considerable length of time.

While I have shown and described the preferred embodiment of my invention, it will be understood that minor changes in construction, combination and arrangement of parts may be made without departing from the spirit and scope of the invention as claimed.

Having thus described my invention, what I claim is:

In combination with a receptacle and an agitating shaft therein, a circular body threaded to the receptacle and having its upper end internally screw threaded, a cap having an annular flange threaded in said body to support said cap in a plane with the upper edge of the body, a wall formed in said body and spaced from the cap to form a compartment and also forming a stop for limiting the threading action of the body on to the receptacle, said wall having a centrally located opening to permit the agitating shaft to project into the compartment, a bearing carried by the cap and receiving the end of the agitating shaft, and an operating means mounted in said compartment and having connection with the agitating shaft.

In testimony whereof I affix my signature in presence of two witnesses.

MAX ECK.

Witnesses:
ALBERT M. ROTH,
LOUIS C. JURCZEK.

Copies of this patent may be obtained for five cents each, by addressing the "Commissioner of Patents, Washington, D. C."